United States Patent [19]

Floryan et al.

[11] 4,026,870

[45] May 31, 1977

[54] EXTRACTION OF COPPER CATALYST FROM POLYPHENYLENE OXIDE SOLUTIONS

[75] Inventors: Daniel Edwin Floryan, Glenmont; Paul Caswell Fruscione, Albany, both of N.Y.

[73] Assignee: General Electric Company, Pittsfield, Mass.

[22] Filed: Jan. 21, 1976

[21] Appl. No.: 650,987

[52] U.S. Cl. .......................................... 260/47 ET
[51] Int. Cl.$^2$ ...................................... C08G 65/44
[58] Field of Search ........................... 260/47 ET

[56] References Cited

UNITED STATES PATENTS

| | | | |
|---|---|---|---|
| 3,365,422 | 1/1968 | Van Dort | 260/47 |
| 3,544,515 | 12/1970 | Katchman et al. | 260/47 |
| 3,838,102 | 9/1974 | Bennett et al. | 260/47 ET |
| 3,951,917 | 4/1976 | Floryan et al. | 260/47 ET |

*Primary Examiner*—Lester L. Lee
*Attorney, Agent, or Firm*—William F. Mufatti; Edward A. Hedman

[57] ABSTRACT

A novel process is disclosed for the preparation of a polyphenylene oxide resin wherein the copper catalyst is extracted by the use of a salt of ethylenediaminetetraacetic acid and a quaternary ammonium salt. The process results in a decrease of the residual copper which is carried over into the polyphenylene oxide resin.

11 Claims, No Drawings

EXTRACTION OF COPPER CATALYST FROM POLYPHENYLENE OXIDE SOLUTIONS

This invention provides a novel process for the preparation of a polyphenylene oxide resin wherein the copper catalyst is extracted by the use of a salt of ethylenediaminetetraacetic acid and a quaternary ammonium salt which results in a decrease of the residual copper which is carried over into the polyphenylene oxide resin.

BACKGROUND OF THE INVENTION

The polyphenylene oxides and processes for their preparation are known in the art and are described in numerous publications, including Hay, U.S. Pat. No. 3,306,874 and U.S. Pat. No. 3,306,875. Other procedures are described in the Bennett and Cooper patents U.S. Pat. Nos. 3,639,656; 3,642,699; 3,733,299; 3,900,445 and 3,661,848. All of these patents are hereby incorporated by reference.

The processes most generally used to prepare polyphenylene ethers are based on the use of a copperamine complex catalyst and oxygen in the self-condensation of a monovalent phenol. Various techniques have been employed in terminating this polymerization reaction, including the use of aqueous solutions of acetic acid, sulfuric acid or chelating agents such as ethylenediaminetetraacetic acid or its mono-, di-, or tetra-substituted alkali metal salts.

The ethylenediaminetetraacetic acid compounds are effective but difficulties are encountered in using them to terminate polyphenylene oxide polymerizations. The free acid form of ethylenediaminetetraacetic acid is not soluble in aqueous or organic solvents to any great extent and must be added to the polyphenylene oxide polymerization reaction as a solid. This fact results in prolonged agitation cycles to assure intimate contact between the solid undissolved particles and the liquid reaction solution. The mono-, di-, tri- and tetra-sodium salts of ethylenediaminetetraacetic acid are of more practical importance for this extraction, since these salts are soluble in water to an appreciable extent and thus a shorter and less vigorous agitation cycle is required to extract the copper catalyst.

The rate of extraction of copper from the organic solution of a polyphenylene oxide by aqueous solutions of ethylenediaminetetraacetic acid salts appears to depend on two parameters: (1) pH of the aqueous solution of an ethylenediaminetetraacetic acid salt and (2) mixing efficiency of the two phases during extraction. With relatively mild agitation, as by hand-shaking or stirring in a beaker with a mechanical stirrer, the lower pH aqueous solutions of ethylenediaminetetraacetic acid exhibit faster extraction of copper than higher pH solutions of ethylenediaminetetraacetic acid salts, the rates following the order: di-sodium ethylenediaminetetraacetic acid (pH~7) > tri-ethylenediaminetetraacetic acid (pH~9) > tetra-sodium ethylenediaminetetraacetic acid (pH~11).

The extraction efficiency of a given ethylenediaminetetraacetic acid salt solution, defined as the weight fraction of copper extracted in a given time by a given mixing technique, therefore follows the same order. Increasing the efficiency of mixing the aqueous ethylenediaminetetraacetic acid phase with the organic solution of a polyphenylene oxide as by mixing in a Waring blendor or an homogenizer results in increased extraction efficiency of the higher pH solutions of ethylenediaminetetraacetic acid salts, as measured by the amount of residual copper in the polyphenylene oxide after precipitation of the polyphenylene oxide with a suitable anti-solvent, such as methanol.

It is desirable to utilize higher pH aqueous solutions of ethylenediaminetetraacetic acid salts for extracting copper from organic solutions; the two salts tri-sodium ethylenediaminetetraacetic acid and tetra-sodium ethylenediaminetetraacetic acid are less expensive than di-sodium ethylenediaminetetraacetic acid or ethylenediaminetetraacetic acid, and they do not extract the amine component of the catalyst as do the lower pH aqueous ethylenediaminetetraacetic acid salt solutions. However, these ethylenediaminetetraacetic acid salts (ethylenediaminetetraacetic acid $(Na)_3$ and ethylenediaminetetraacetic acid $(Na)_4$) require longer extraction times and/or improved mixing, as shown in the above discussion, to give low copper residues in polyphenylene oxide. Longer extraction times results in re-equilibration reactions of polyphenylene oxide to give reduced molecular weight, and are therefore undesirable. Improved mixing results in emulsification, making separation of the aqueous ethylenediaminetetraacetic acid-copper solution from the organic polyphenylene oxide solution difficult.

It has now been found that the rate of extraction of copper from polyphenylene oxide reaction solutions by aqueous high pH solutions of tri-sodium ethylenediaminetetraacetic acid and tetra-sodium ethylenediaminetetraacetic acid can be greatly accelerated by the addition to the two-phase extraction system of small amounts of quaternary ammonium salts, such as trioctylmethylammonium chloride, tetraethyl ammonium chloride and tetrabutyl ammonium chloride. Amounts of quaternary ammonium salt as low as 25 ppm based on the weight of organic polymer solutions are effective in this regard.

In the prior art quaternary ammonium salts have been employed in promoting the copper-amine oxidation of monovalent phenols in the preparation of polyphenylene oxide polymers. This is shown in U.S. Pat. No. 3,365,422 and in copending application Ser. No. 485,741. These processes employ the quaternary ammonium salts in the oxidation stage of the process and not in the polymer recovery stages.

The process of the present invention results in a reduced level of copper in the polyphenylene oxide product over that which would be obtained by the use of the quaternary ammonium salt alone or over the use of ethylenediaminetetraacetic acid or its salts alone, when the materials are employed in equivalent processing cycles.

DETAILED DESCRIPTION OF THE INVENTION

The invention provides in a process for the preparation of a high-molecular weight polyphenylene oxide having a degree of polymerization of at least 50 by oxidatively coupling a monovalent phenol having substitution in at least the two ortho positions and hydrogen or halogen in the para position, using an oxygen-containing gas and a complex copper-amine catalyst as the oxidizing agent, and extracting the copper catalyst with an aqueous solution of a salt of ethylenediaminetetraacetic acid, an improvement which comprises promoting the extraction efficiency of the salt of ethylenediaminetetraacetic acid by employing in addition to said salt, an effective amount of a quaternary ammonium salt of the formula:

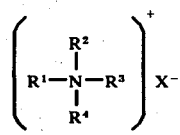

wherein $R^1$, $R^2$, $R^3$ and $R^4$ are selected from the group consisting of alkyl, alkenyl and aralkyl radicals of from 1-24 carbon atoms and X is an anion of an inorganic acid. The inorganic acid anions may be chloride, bromide, sulfate or phosphate.

The preferred polyphenylene oxides are of the formula:

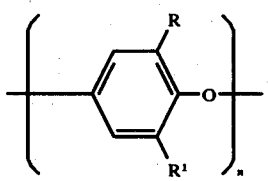

wherein the oxygen ether atom of one unit is connected to the benzene nucleus of the next adjoining unit, n is an integer of at least 50; and R and $R^1$ are monovalent substituents selected from hydrogen, halogen, hydrocarbon radicals, halohydrocarbon radicals having at least two carbon atoms between the halogen atoms and the phenyl nucleus, hydrocarbonoxy and halohydrocarbonoxy radicals having at least two carbon atoms between the halogen atom and the phenyl nucleus.

The preferred material is poly (2,6-dimethyl-1,4-phenylene) oxide. Useful polymers of 2,6-dimethyl phenol include those having an intrinsic viscosity of about 0.5 in $CHCl_3$ at 30° C.

The polymerization of the phenolic monomer may be carried out by adding the phenolic monomer to a suitable reaction solvent and preferably a copper-amine catalyst. It is preferred to carry out the polymerization in the presence of a cupric salt-secondary amine catalyst such as cupric chloride and di-n-butylamine. These polymerizations are advantageously carried out in the presence of an inorganic alkali metal bromide or an alkaline earth metal bromide. The inorganic bromides may be used at a level of from 0.1 mole to 150 moles per 100 moles of phenolic monomer. These materials are described in U.S. Pat. No. 3,733,299.

Tetraalkylammonium salts may also be employed as promoters if desired. These materials are disclosed in copending application U.S. Pat. No. 3,988,297, which is hereby incorporated by reference.

The primary, secondary or tertiary amine component of the catalyst complex corresponds to those disclosed in the abovementioned Hay patents. Illustrative members include aliphatic amines, including aliphatic mono- and di-amines, where the aliphatic group can be straight or branched chain hydrocarbon or cycloaliphatic. Preferred are aliphatic primary, secondary and tertiary monoamines and tertiary diamines. Especially preferred are mono-, di- and tri(lower) alkyl amines, the alkyl groups having from 1 to 6 carbon atoms. Typically, there can be used mono-, di- and tri-methyl, ethyl, n-propyl, i-propyl, n-butyl substituted amines, mono-and di-cyclohexylamine, ethylmethyl amine, morpholine, N-(lower) alkyl cycloaliphatic amines, such as N-methylcyclohexylamine, N,N'-dialkylethylenediamines, the N,N'-dialkylpropanediamines, the N,N,N'-trialkylpentanediamines, and the like. In addition, cyclic tertiary amines, such as pyridine, alpha-collidine, gamma picoline, and the like, can be used. Especially useful are N,N,N',N'-tetraalkylethylenediamines, butane-diamines, and the like.

Mixtures of such primary, secondary and tertiary amines may be used if desired. A preferred mono(lower) alkyl amine is n-butyl amine; a preferred di(lower) alkyl amine is di-n-butyl amine; and a preferred tri(lower) alkyl amine is triethyl amine. A preferred cyclic tertiary amine is pyridine. The concentration of primary and secondary amine in the reaction mixture may vary within wide limits, but is desirably added in low concentrations. A preferred range comprises from about 2.0 to 25.0 moles per 100 moles of monovalent phenol. In the case of a tertiary amine, the preferred range is considerably broader, and comprises from about 0.2 to about 1500 moles per 100 moles of monovalent phenol. With tertiary amines, if water is not removed from the reaction mixture, it is preferred to use from about 500 to about 1500 moles of amine per 100 moles of phenol. If water is removed from the reaction, then only 10 moles of tertiary amine, e.g., trimethyl amine or triethyl amine, per 100 moles of phenol need be used as a lower limit. Even smaller amounts of tertiary diamines, such as N,N,N',N'-tetramethylbutanediamine can be used, down to as low as 0.2 mole per 100 moles of phenol.

Typical examples of cuprous salts and cupric salts suitable for the process are shown in the Hay patents. These will include cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric tolulate, and the like. Preferred cuprous and cupric salts are the halides, alkanoates or sulfates, e.g., cuprous bromide and cuprous chloride, cupric bromide and cupric chloride, cupric sulfate, cupric fluoride, cuprous acetate and cupric acetate. With primary and secondary amines, the concentration of the copper salts is desirably maintained low and preferably varies from about 0.2 to 2.5 moles per 100 moles of monovalent phenol. With tertiary amines, the copper salt is preferably used in an amount providing from about 0.2 to about 15 moles per 100 moles of the monovalent phenol.

The polymerization reaction is preferably performed in a solvent. Suitable solvents are disclosed in the above-noted Hay patents. Aromatic solvents such as benzene, toluene, xylene and o-dichlorobenzene are especially preferred, although tetrachloromethane, trichloromethane, dichloromethane, 1,2-dichloroethane and trichloroethylene may also be used.

The process for forming the polymer and the reaction conditions, such as temperature, oxygen, flow rate and the like are essentially the same as the conditions disclosed in the abovementioned Hay patents, though reaction time to generate high-molecular weight polymer is reduced. The above-noted concentration ranges are preferred, though these ranges may vary to some extent depending upon oxygen flow rate, reaction temperature and the like.

The quaternary ammonium salts are well known and many are commercially available. The tetraalkyl substituted compounds of from 1-20 carbon atoms are preferred. The alkyl substituents may be methyl, ethyl, propyl, butyl, hexyl, octyl, decyl, cetyl, hexadecyl and isomers thereof. Mixtures of these compounds may also be employed. The aralkyl substituent may include alkyl-monocarbocyclic radials having from 7 to 20 carbon atoms such as benzyl, phenethyl and the like. The alkenyl substituents include straight and branched chain unsaturated hydrocarbon atoms of from 1–24 carbon atoms which contain one or more double bonds such as 2-pentenyl, 3,4-ditetradecenyl, 3-hexadecenyl, 6-eicosenyl, 8-heneicosenyl, 6-tricosenyl and the like.

The quaternary ammonium salts are described in the literature and may be prepared according to standard techniques. In addition, reference may be made to Kirk-Othmer Encyl. of Chemical Technology, second edition, Volume 16, pp. 859–865; Arquads, Armour Industrial Co. (1956) and Schwartz, A.M. et al, Surface Active Agents, Vol. 1, pp. 156–171 and Interscience Publishers (1949) and Vol. II, pp. 112–118 (1958), all of which are incorporated by reference. A particularly useful compound is methyl-tri-n-octylammonium chloride.

The mono-, di-, tri- and tetra-substituted salts of ehtylenediaminetetraacetic acid may be employed in carrying out the diclosed process. The alkali metal salts, i.e., sodium, lithium and potassium may optionally be employed, although, it is preferred for reasons of economy to employ tri-sodium ethylenediaminetetraacetic acid or tetra-sodium ethylenediaminetetraacetic acid.

In the practice of the present invention, it is preferred to employ a mole ratio of from 1:1 to 5:1 of the salt of ethylenediaminetetraacetic acid to copper in combination with from 25 to 2000 ppm of the quaternary ammonium salt, based on organic polyphenylene oxide reaction mixture. The preferred amounts of quaternary ammonium salt are in the range of 100–500 ppm.

The quaternary ammonium salt may be added to the reaction mixture as a solution in a reaction mixture-compatible solvent such as toluene, benzene, or chloroform. It is preferred to first add the quaternary ammonium salt to the reaction mixture prior to adding the salt of ethylenediaminetetraacetic acid, although these may be added together or in reverse order.

After the copper is extracted, an antisolvent such as a lower alkanol of 1-10 carbon atoms, hexane, acetone, etc. is added and the polyphenylene oxide is recovered in accordance with standard procedures.

DESCRIPTION OF THE PREFERRED EMBODIMENTS

The following examples illustrate the procedures wherein quaternary ammonium salts are advantageously employed according to the present invention.

EXAMPLE 1 *

* control 0.25 g of cupric chloride and 0.39 g of sodium bromide were mixed in 6 ml of methanol and added to a solution of 500 cc toluene containing 10.9 g of di-n-butylamine in a 1 liter glass reactor. 70 g of 2,6-xylenol in 83 cc of toluene was added over a period of 15 minutes with addition of $O_2$ gas at 170 cc/minute and stirring at a rate of ~1500 RPM. The reaction temperature was maintained at 30° C. After 120 minutes $O_2$ addition was stopped and the reaction mixture split into three parts. Each was mixed vigorously with sufficient 10% by weight aqueous ethylenediaminetetraacetic acid salt in a Waring blendor for ten minutes to give a molar ratio of 1.5:1 ethylenediaminetetraacetic acid: Cu. The ethylenediaminetetraacetic acid salts used were di-sodium ethylenediaminetetraacetic acid, tri-sodium ehtylenediaminetetraacetic acid and tetra-sodium ethylenediaminetetraacetic acid. Polyphenylene oxide was isolated from each portion by addition of methanol at ~1.5:1 volume ratio to the polymer solution. The polyphenylene oxide was washed with methanol and dried overnight at ~110° C in an air oven. All three polyphenylene oxide samples contained <5 ppm copper by atomic absorption, and measured an intrinsic viscosity in chloroform at 30° C of 0.55 dl/g.

EXAMPLE 2 *

* control

A polyphenylene oxide solution prepared as in Example 1 was split into three portions after the end of reaction and each portion was extracted by hand shaking for two minutes with sufficient 10% by weight aqueous ethylenediaminetetraacetic acid salt to give an ethylenediaminetetraacetic acid: Cu molar ratio of 1.5:1. The ethylenediaminetetraacetic acid salts used and the residual copper level in the polyphenylene oxide on isolation by methanol precipitation are shown in Table 1:

TABLE 1

| Ethylenediaminetetraacetic acid Salt | Residual Copper Level in Polyphenylene oxide (ppm) |
|---|---|
| Ethylenediaminetetraacetic acid $(Na)_2$ | 13 |
| Ethylenediaminetetraacetic acid $(Na)_3$ | 35 |
| Ethylenediaminetetraacetic acid $(Na)_4$ | 105 |

EXAMPLE 3

A polyphenylene oxide solution prepared as in Example 1 was split into three portions after the reaction was completed. One portion was extracted by hand shaking for 0.5 minutes with sufficient aqueous ethylenediaminetetraacetic acid $(Na)_3$ to give an ethylenediaminetetraacetic acid: Cu molar ratio of 1.1:1. The second portion was extracted with ethylenediaminetetraacetic acid $(Na)_3$ in the same way except that 2000 ppm trioctylmethylammonium chloride based on the polyphenylene oxide solution was added before the extraction with ethylenediaminetetraacetic acid $(Na)_3$. The third portion was extracted in the same way as the second, except that 2000 ppm tetra ethylammonium chloride was added in place of the trioctylmethylammonium chloride. The residual copper levels in the polyphenylene oxide on isolation by precipitation with methanol and drying, are shown in Table II:

TABLE II

| Quaternary Ammonium Salt | Residual Copper in Polyphenylene Oxide (ppm) |
|---|---|
| None | 200 |
| Trioctylmethylammonium Chloride | 32 |
| Tetraethylammonium Chloride | 35 |

EXAMPLE 4

The experiment of Example 3 was repeated using aqueous ethylenediaminetetraacetic acid $(Na)_4$ in place of ethylenediaminetetraacetic acid (Na)₃. The results are shown in Table III:

TABLE III

| Quaternary Ammonium Salt | Residual Copper in Polyphenylene Oxide (ppm) |
|---|---|
| None | 500 |
| Trioctylmethylammonium Chloride | 124 |
| Tetraethylammonium Chloride | 150 |
| Tetrabutylammonium Chloride | 275 |

EXAMPLE 5

A polyphenylene oxide solution prepared as in Example 1 but on a larger scale to provide about 40 liters of reaction solution, was extracted with 10% by weight aqueous ethylenediaminetetraacetic acid (Na)₃ at a molar ratio of ethylenediaminetetraacetic acid: Cu of 1.5:1, in a continuously stirred extraction system consisting of a three liter vessel fitted with a flat-bladed paddle agitator and baffles. The polyphenylene oxide reaction solution was pumped to this stirred vessel through a mixer in which the aqueous ethylenediaminetetraacetic acid (Na)₃ solution was added to and mixed with the organic polyphenylene oxide solution. The flow rate to the continuous stirred vessel extraction system was varied in order to vary the average residence time after addition of the aqueous ethylenediaminetetraacetic acid (Na)₃. Extracted polyphenylene oxide solution was removed from the stirred vessel continuously by means of an overflow tube, so as to keep a fixed volume of polyphenylene oxide solution in the vessel. The average residence time in the vessel was then defined as the volume of the vessel (in liters) divided by the flow rate of the polyphenylene oxide solution (in liters per minute). Polyphenylene oxide solution directly from reaction was extracted with ethylenediaminetetraacetic acid (Na)₃ in this extraction system, and the results are compared with polyphenylene oxide solution to which was added 200 ppm of trioctylmethylammonium chloride, in Table IV:

TABLE IV

| | Residual Copper in Polyphenylene Oxide (ppm) | |
|---|---|---|
| Average Residence Time of Extraction (min.) | Ethylenediaminetetraacetic acid (Na)₃ | Ethylenediaminetetraacetic acid (Na)₃ + Trioctylmethyl Ammonium Chloride |
| Mixer Only (<1) | 400 | 165 |
| 20 | 246 | 42 |
| 30 | 103 | 34 |
| 45 | 85 | 24 |

Although the above examples have shown various modifications of the present invention, other variations are possible in light of the above teachings. It is, therefore, to be understood that changes may be made in the particular embodiments of the invention described which are within the full intended scope of the invention as defined by the appended claims.

We claim:

1. In a process for the preparation of a high-molecular weight polyphenylene oxide having a degree of polymerization of at least 50 by oxidatively coupling a monovalent phenol having substitution in at least the two ortho positions and hydrogen or halogen in the para-position, using an oxygen-containing gas, and a complex copper-amine catalyst as the oxidizing agent, and extracting the copper catalyst with an aqueous solution of a salt of ethylenediaminetetraacetic acid, the improvement which comprises promoting the extraction efficiency of the salt of thylenediaminetetraacetic acid by employing in addition to said salt an effective amount of a quaternary ammonium salt of the formula:

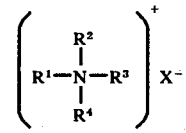

wherein $R^1$, $R^2$, $R^3$ and $R^4$ are selected from the group consisting of alkyl, alkenyl and aralkyl radicals of from 1-24 carbon atoms and X is anion of an inorganic acid.

2. A process as defined in claim 1 wherein the polyphenylene oxide has repeating units of the formula:

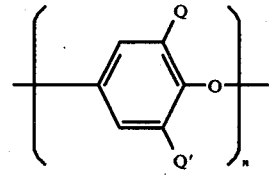

wherein the oxygen ether atom of one unit is connected to the benzene nucleus of the next adjoining unit, n is an integer of at least 50; and Q and Q' are monovalent substituents selected from hydrogen, halogen, hydrocarbon radicals, halohydrocarbon radicals having at least two carbon atoms between the halogen atom and the phenyl nucleus.

3. A process as defined in claim 2 wherein $R^1$, $R^2$, $R^3$ and $R^4$ are alkyl of from 1-20 carbon atoms.

4. A process as defined in claim 3 wherein the polyphenylene oxide is poly(2,6-dimethyl-1,4-phenylene) oxide.

5. A process as defined in claim 3 wherein a mole ratio of from 1:1 to 5:1 of the salt of ethylenediamimetetraacetic acid to copper is employed in combination with from 25-2000 parts per million parts of organic polyphenylene oxide reaction solution.

6. A process as defined in claim 5 wherein the polyphenylene oxide is formed in the presence of a complex catalyst comprising a cupric salt and a secondary amine.

7. A process as defined in claim 6 wherein the cupric salt is cupric chloride and the secondary amine is di-n-butylamine.

8. In a process for the preparation of a high-molecular weight poly (2,6-dimethyl-1,4-phenylene) oxide having a degree of polymerization of at least 50 by oxidatively coupling 2,6- xylenol using oxygen and a cupric chloride-di-n-butylamine catalyst as the oxidizing agent and extracting the copper catalyst with an aqueous solution of a salt of ethylenediaminetetraacetic acid wherein a mole ratio of from 1:1 to 5:1 of the salt of ethylenediaminetetraacetic acid to copper by the improvement which comprises employing said salt in combination with from 25-2000 ppm based on the weight of the polyphenylene oxide reaction solution of a quaternary ammonium salt of the formula:

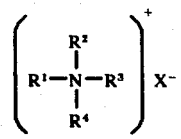

wherein $R^1$, $R^2$, $R^3$ and $R^4$ are alkyl of from 1–20 carbon atoms.

9. A process as defined in claim 8 wherein a mole ratio of from 1:1 to 5:1 of the salt of ethylenediaminetetraacetic acid to copper is employed in extracting the copper catalyst.

10. A process as defined in claim 9 wherein the copper catalyst is a cupric chloride-di-n-butylamine complex.

11. In a process for the preparation of a high-molecular weight polyphenylene oxide having a degree of polymerization of at least 50 by oxidatively coupling a monovalent phenol having substitution in at least the two ortho positions and hydrogen or halogen in the para-position, using an oxygen-containing gas, and a complex copper-amine catalyst as the oxidizing agent, and extracting the copper catalyst with an aqueous solution of a salt of ethylenediaminetetraacetic acid, at a mole ratio of 1:1 to 5:1 of the salt of ethylenediaminetetraacetic acid to copper, the improvement which comprises promoting the extraction efficiency of the salt of ethylenediaminetetraacetic acid by employing in addition to said salt from 100 to 500 ppm of a quaternary ammonium salt of the formula:

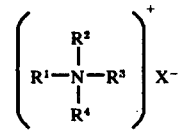

wherein R, R, R and R are selected from the group consisting of alkyl, alkenyle and aralkyl radicals of from 1–24 carbon atoms and X is anion of an inorganic acid.

* * * * *

UNITED STATES PATENT OFFICE
CERTIFICATE OF CORRECTION

Patent No. 4,026,870                    Dated May 31, 1977

Inventor(s)  Daniel E. Floryan et al.

It is certified that error appears in the above-identified patent and that said Letters Patent are hereby corrected as shown below:

Column 5, line 4, "radials" should be -- radicals --

Column 8, claim 1, line 3, "thylenediaminetetraacetic" should be -- ethylenediamimetetraacetic --

Column 8, claim 5, line 44, "ethylenediamimetetraacetis" should be -- ethylenediaminetetraacetic --

Column, 10, claim 11, line 19, "alkenyle" should be -- alkenyl --.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*